United States Patent
Wang et al.

(10) Patent No.: US 9,129,125 B2
(45) Date of Patent: Sep. 8, 2015

(54) DATA SHARING METHOD AND DEVICE

(71) Applicant: Huawei Device Co., LTD, Shenzhen (CN)

(72) Inventors: Chan Wang, Shenzhen (CN); Jiejing Huang, Shenzhen (CN); Huangwei Wu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/168,585

(22) Filed: Jan. 30, 2014

(65) Prior Publication Data

US 2014/0215210 A1    Jul. 31, 2014

(30) Foreign Application Priority Data

Jan. 30, 2013   (CN) .......................... 2013 1 0035962

(51) Int. Cl.
*G06F 21/00* (2013.01)
*G06F 21/62* (2013.01)
*H04L 29/06* (2006.01)

(52) U.S. Cl.
CPC ........ *G06F 21/6209* (2013.01); *H04L 63/0428* (2013.01); *H04L 63/0478* (2013.01)

(58) Field of Classification Search
USPC ...................................... 713/156, 178; 380/29
See application file for complete search history.

(56) References Cited

U.S. PATENT DOCUMENTS

| | | | |
|---|---|---|---|
| 6,557,102 B1 * | 4/2003 | Wong et al. ................... | 713/176 |
| 6,947,556 B1 * | 9/2005 | Matyas et al. ................. | 380/29 |
| 2003/0037054 A1 * | 2/2003 | Dutta et al. ................... | 707/100 |
| 2003/0051144 A1 * | 3/2003 | Williams ...................... | 713/178 |
| 2009/0287706 A1 * | 11/2009 | Bourges-Waldegg et al. .... | 707/9 |

FOREIGN PATENT DOCUMENTS

| | | |
|---|---|---|
| CN | 101833615 A | 9/2010 |
| CN | 102457507 A | 5/2012 |
| EP | 2273409 A2 | 1/2011 |
| EP | 2544117 A1 | 1/2013 |
| WO | 2004046957 A2 | 6/2004 |

OTHER PUBLICATIONS

"An empirical study of collusion behavior in the Maze P2P file-sharing system"; Q Lian et al; Distributed Computing Systems, 2007; 13 pages.*

* cited by examiner

*Primary Examiner* — Jason Lee
(74) *Attorney, Agent, or Firm* — Slater & Matsil, L.L.P.

(57) ABSTRACT

A method includes receiving a request by a second user through a uniform resource locator (URL) for a user key of a shared file of a first user. The second user is a legitimate user authorized by the first user through a trust center to access the shared file. The shared file is a shared file encrypted by using the user key of the first user. A file description of the corresponding shared file is obtained from a cloud server according to the URL. The file description is a file description obtained by encrypting the user key by using a public key of the trust center. The file description is decrypted using a private key corresponding to the public key of the trust center to obtain the user key of the first user. The user key is sent to the second user.

6 Claims, 12 Drawing Sheets

DATA SHARING METHOD AND DEVICE

CROSS-REFERENCE TO RELATED APPLICATION

This application claims priority to Chinese Patent Application No. 201310035962.6, filed on Jan. 30, 2013, which is hereby incorporated by reference in its entirety.

TECHNICAL FIELD

The present invention relates to the field of network technologies, and in particular, to a data sharing method and device.

BACKGROUND

With the development of network technologies, more and more enterprises and individuals are willing to upload their data to a cloud to reduce a storage cost. A cloud service provider (or a cloud server) may conveniently handle a lot of things for users, such as data sharing and data backup. During data sharing and data backup, security is a problem most concerned by users, and is also a biggest challenge currently faced by the cloud service provider. If a user does not trust the cloud service provider, data is encrypted before being uploaded to the cloud. Therefore, in a cloud environment, how to securely share data on a cloud server with another user is a problem to be solved currently.

In the prior art, if a user wants to share data uploaded to a server of a cloud service provider, share permissions of the data need to be set in servers of different service providers to allow access by another user. Further, in order to obtain the shared data, another user needs to log in the servers of the different service providers, and obtain the data shared by the user successively through the permissions set in the servers of the different service providers.

It can be known from the research and practice of the prior art that a user cannot flexibly share data on a cloud server, and can obtain, only by logging in service sites provided by servers of different service providers, shared data stored on a cloud server by a corresponding service provider. Since a user needs to successively log in corresponding service sites before accessing shared data, the shared data cannot be accessed securely and conveniently.

SUMMARY

Embodiments of the present invention provide a data sharing method and device, so as to solve a technical problem in the prior art that a user cannot securely and conveniently access data on a cloud server.

In order to solve the technical problem, the embodiments of the present invention disclose the following technical solutions.

In a first aspect, a data sharing method is provided and includes:

receiving a request by a second user through a uniform resource locator URL for a user key of a shared file of a first user, where the second user is a legitimate user authorized by the first user through a trust center to access the shared file, and the shared file is a shared file encrypted by using the user key;

obtaining, according to the URL, a file description of the corresponding shared file from a cloud server, where the file description is a file description obtained by encrypting the user key by using a public key of the trust center;

decrypting the file description by using a private key corresponding to the public key of the trust center to obtain the user key of the first user; and sending the user key to the second user.

In a first possible implementation manner of the first aspect, the obtaining, according to the URL, a file description of the shared file from a cloud server further includes:

obtaining the shared file corresponding to the URL;

decrypting the obtained shared file by using the user key to obtain the original shared file of the first user;

encrypting the original shared file by using a temporary key to obtain a temporary file; and uploading the temporary file to the cloud server, and obtaining a temporary URL that is delivered by the cloud server and corresponds to the temporary file; and the sending the user key to the second user specifically includes:

sending the temporary URL and the temporary key to the second user.

In a second aspect, a data sharing method is provided, and the method includes:

encrypting a file, to be uploaded to a cloud server, by using a user key to obtain an encrypted shared file, encrypting the user key by using a public key of a trust center, and using the encrypted user key as a file description;

uploading the encrypted shared file and the file description to the cloud server;

receiving a uniform resource locator URL that is sent by the cloud server and corresponds to the shared file;

authorizing, through the trust center, a second user to access the shared file; and sending the URL to the second user, so that the second user obtains the user key according to the URL and decrypts the shared file by using the user key.

In a first possible implementation manner of the second aspect:

the obtaining, by the second user, the shared file and the user key according to the URL and decrypting the shared file by using the user key specifically includes:

obtaining, by the second user, the user key of the shared file from the trust center and obtaining the shared file from the cloud server according to the URL, and decrypting the shared file by using the user key.

With reference to the second aspect or the first possible implementation manner of the second aspect, in a second possible implementation manner:

the obtaining, by the second user, the shared file and the user key according to the URL and decrypting the shared file by using the user key specifically includes:

requesting, by the second user, the user key of the shared file corresponding to the URL from the trust center;

receiving a temporary URL and a temporary key sent by the trust center in response to the request, where the temporary key is a key through which the trust center re-encrypts the shared file that is obtained and decrypted, the temporary URL is a URL that is returned by the cloud server and corresponds to the temporary file, and the temporary file is a file obtained by the trust center by re-encrypting the shared file that is obtained and decrypted;

obtaining the temporary file corresponding to the temporary URL from the cloud server; and decrypting the temporary file by using the temporary key.

In a third aspect, a data sharing method is provided, and the method includes:

receiving a shared file and a corresponding file description that are sent by a first user, where the shared file is a shared file encrypted by using a user key of the first user, and the file description is a file description obtained by encrypting the user key by using a public key of a trust center;

storing the shared file and the corresponding file description;

sending a uniform resource locator URL corresponding to storage of the shared file to the first user;

receiving a request, sent by the trust center, for obtaining the file description corresponding to the URL;

sending a response including the file description to the trust center, so that the trust center decrypts the file description by using a private key corresponding to the public key to obtain the user key, and the trust center sends the user key to a second user;

receiving a request, sent by the second user, for the shared file corresponding to the URL, where the second user is a user authorized by the first user through the trust center to access the shared file; and sending the shared file corresponding to the URL to the second user, so that the second user decrypts the shared file according to the user key that is received.

In a fourth aspect, a data sharing method is provided, and the method includes:

receiving a shared file and a corresponding file description that are sent by a first user, where the shared file is a shared file encrypted by using a user key of the first user, and the file description is a file description obtained by encrypting the user key by using a public key of a trust center;

storing the shared file and the corresponding file description;

sending a uniform resource locator URL corresponding to storage of the shared file and the corresponding file description to the first user;

receiving a request, sent by the trust center, for obtaining the shared file and the file description corresponding to the URL;

sending a response including the shared file and the file description to the trust center, so that the trust center decrypts the file description by using a private key corresponding to the public key to obtain the user key, decrypts the shared file by using the user key, and then re-encrypts the shared file by using a temporary key to obtain a temporary file;

receiving the temporary file sent by the trust center;

storing the temporary file;

sending a temporary URL corresponding to storage of the temporary file to the trust center, so that the trust center sends the temporary key and the temporary URL to a second user;

receiving a request, sent by the second user, for obtaining the temporary file corresponding to the temporary URL; and sending a response including the temporary file to the second user, so that the second user decrypts the temporary file according to the temporary key.

In a fifth aspect, a data sharing device is provided and includes:

a first receiving unit, configured to receive a request by a second user through a uniform resource locator URL for a user key of a shared file of a first user, where the second user is a legitimate user authorized by the first user through a trust center to access the shared file, and the shared file is a shared file encrypted by using the user key;

an obtaining unit, configured to obtain, according to the URL, a file description of the corresponding shared file from a cloud server, where the file description is a file description obtained by encrypting the user key by using a public key of the trust center;

a first decrypting unit, configured to decrypt the file description by using a private key corresponding to the public key of the trust center to obtain the user key of the first user; and a first sending unit, configured to send the user key to the second user.

In a first possible implementation manner of the fifth aspect:

the obtaining unit is further configured to, while obtaining, according to the URL, the file description of the shared file from the cloud server, obtain the shared file corresponding to the URL, and the device further includes:

a second decrypting unit, configured to decrypt the obtained shared file by using the user key obtained by the first decrypting unit to obtain an original shared file of the first user;

an encrypting unit, configured to encrypt the original shared file by using a temporary key to obtain a temporary file;

a second sending unit, configured to upload the temporary file to the cloud server; and a second receiving unit, configured to a temporary URL that is delivered by the cloud server and corresponds to the temporary file; and the first sending unit is further configured to send the temporary URL and the temporary key to the second user.

In a sixth aspect, a data sharing device is provided and includes:

an encrypting unit, configured to encrypt a file, to be uploaded to a cloud server, by using a user key to obtain an encrypted shared file, encrypt the user key by using a public key of a trust center, and use the encrypted user key as a file description;

a first sending unit, configured to upload the encrypted shared file and the file description to the cloud server;

a first receiving unit, configured to receive a uniform resource locator URL that is sent by the cloud server and corresponds to the shared file;

an authorizing unit, configured to authorize, through the trust center, a second user to access the shared file; and a second sending unit, configured to send the URL to the second user, so that the second user obtains the shared file and the user key according to the URL, and decrypts the shared file by using the user key.

In a seventh aspect, a data sharing device is provided and includes:

a first receiving unit, configured to receive a shared file and a corresponding file description that are sent by a first user, where the shared file is a shared file encrypted by using a user key of the first user, and the file description is a file description obtained by encrypting the user key by using a public key of a trust center;

a storing unit, configured to store the shared file and the corresponding file description;

a first sending unit, configured to send a uniform resource locator URL corresponding to storage of the shared file to the first user;

a second receiving unit, configured to receive a request, sent by the trust center, for obtaining the file description corresponding to the URL;

a second sending unit, configured to send a response including the file description to the trust center, so that the trust center decrypts the file description by using a private key corresponding to the public key to obtain the user key, and the trust center sends the user key to a second user;

a third receiving unit, configured to receive a request, sent by the second user, for the shared file corresponding to the URL, where the second user is a user authorized by the first user through the trust center to access the shared file; and a third sending unit, configured to send the shared file corresponding to the URL to the second user, so that the second user decrypts the shared file according to the user key that is received.

In an eighth aspect, a data sharing device is provided and includes:

a first receiving unit, configured to receive a shared file and a corresponding file description that are sent by a first user, where the shared file is a shared file encrypted by using a user key of the first user, and the file description is a file description obtained by encrypting the user key by using a public key of a trust center;

a first storing unit, configured to store the shared file and the corresponding file description;

a first sending unit, configured to send a uniform resource locator URL corresponding to storage of the shared file and the file description to the first user;

a second receiving unit, configured to receive a request, sent by the trust center, for obtaining the shared file and the file description corresponding to the URL;

a second sending unit, configured to send a response including the shared file and the file description to the trust center, so that the trust center decrypts the file description by using a private key corresponding to the public key to obtain the user key, decrypts the shared file by using the user key, and then re-encrypts the shared file by using a temporary key to obtain a temporary file;

a third receiving unit, configured to receive the temporary file sent by the trust center;

a second storing unit, configured to store the temporary file;

a third sending unit, configured to send a temporary URL corresponding to storage of the temporary file to the trust center, so that the trust center sends the temporary key and the temporary URL to a second user;

a fourth receiving unit, configured to receive a request, sent by the second user, for obtaining the temporary file corresponding to the temporary URL; and a fourth sending unit, configured to send a response including the temporary file to the second user, so that the second user decrypts the temporary file according to the temporary key.

It can be known from the foregoing technical solutions that, in the embodiments of the present invention, user data (that is, a shared file) is encrypted before being uploaded to a cloud server, and a trust center performs authentication regarding that a first user authorizes another user to access the user data uploaded to a cloud, so as to solve a security problem of sharing a shared file on a cloud server, improve confidence of a user terminal in cloud security, and enable a user to conveniently share shared data stored on a cloud server.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
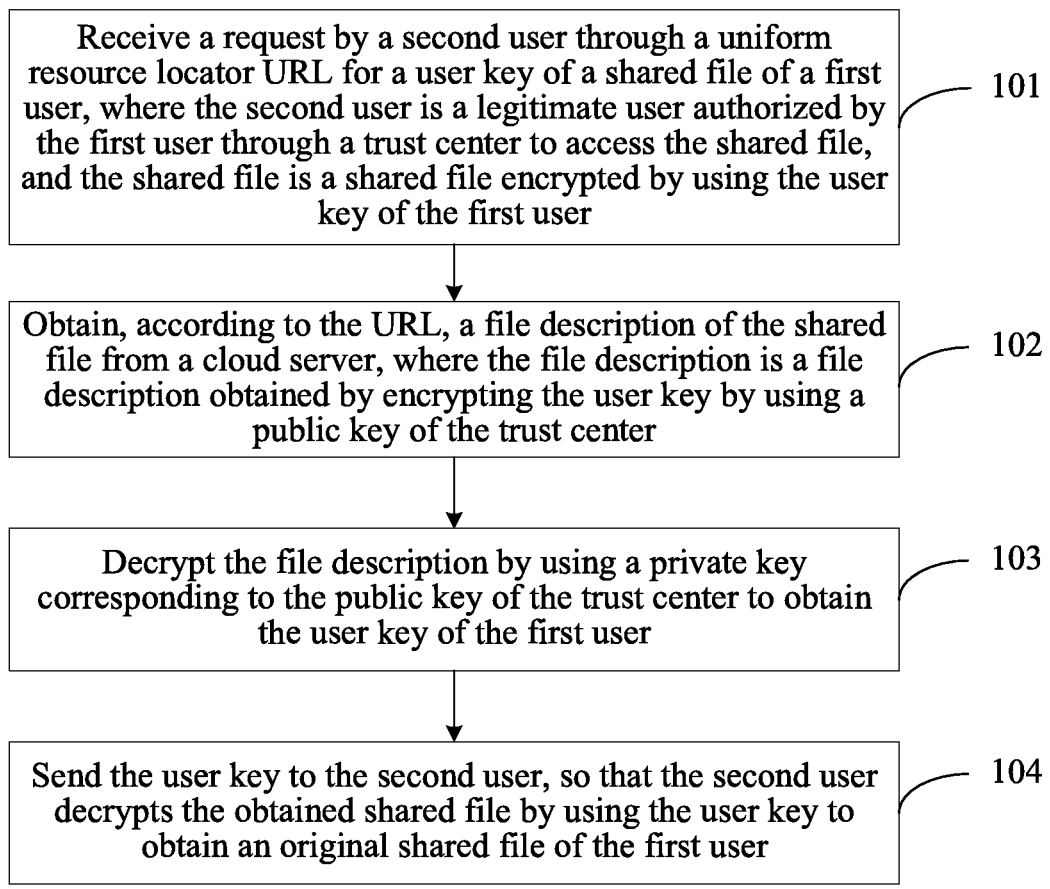
FIG. 1 is a flow chart of a data sharing method according to an embodiment of the present invention.

Referring to FIG. 1, FIG. 1 is a flow chart of a data sharing method according to an embodiment of the present invention. In this embodiment, a trust center (that is, a third party) is introduced between a user terminal (a consumer) and a cloud server (a server of a cloud service provider). In this embodiment, it is assumed that the cloud service provider is untrustworthy. The trust center includes a certificate authority (Certificate Authority, CA) and a key distribution center (Key Distribution Center, KDC). In this embodiment, it is generally regarded by default that a communication channel between the user terminal and the trust center is secure, so that a key negotiation process between the user terminal and the trust center is also secure. The method includes the following steps:

Step 101: Receive a request by a second user through a uniform resource locator URL for a user key of a shared file of a first user, where the second user is a legitimate user authorized by the first user through a trust center to access the shared file, and the shared file is a shared file encrypted by using the user key of the first user.

In this step, the first user first uses the user key of the first user to encrypt a shared file to be uploaded to obtain an encrypted shared file, uses a public key of the trust center to encrypt the user key, and uses the encrypted user key as a file description of the shared file. Then, the first user uploads the file description and the encrypted shared file to a cloud server, and receives the uniform resource locator (URL) that is fed back by the cloud server and corresponds to the shared file. Then, the first user authorizes, through the trust center, the second user to access the URL of the encrypted shared file, and after the trust center verifies that the second user is a legitimate user, the URL is sent to the second user.

Then, the trust center receives the request by the second user for obtaining the user key of the shared file corresponding to the URL.

Step 102: Obtain, according to the URL, the file description of the shared file from the cloud server, where the file description is a file description obtained by encrypting the user key by using the public key of the trust center.

Based on step 101, the trust center requests the file description corresponding to the URL from the cloud server, and receives the file description fed back by the cloud server.

Step 103: Decrypt the file description by using a private key corresponding to the public key of the trust center to obtain the user key of the first user.

In this step, upon receiving the file description corresponding to the URL, the trust center decrypts the file description by using the private key corresponding to the public key to obtain the user key of the first user.

Step 104: Send the user key to the second user, so that the second user decrypts the obtained shared file by using the user key to obtain an original shared file of the first user.

In this step, the trust center may send the user key to the second user through a secure channel; the second user first obtains the corresponding shared file from the cloud server according to the URL, and then decrypts the obtained shared file by using the user key to obtain the original shared file of the first user.

In the embodiment of the present invention, user data (that is, a shared file) is encrypted before being uploaded to a cloud server, and a trust center performs authentication regarding that a first user authorizes another user to access the user data uploaded to a cloud, so as to solve a security problem of sharing a shared file on a cloud server, improve confidence of a user terminal in cloud security, and enable a user to conveniently share shared data stored on a cloud server.

Optionally, in another embodiment, on the basis of the foregoing embodiment, this embodiment may further include: while obtaining the file description of the shared file from the cloud server according to the URL, the trust center further obtains the shared file corresponding to the URL; then, the obtained shared file is decrypted by using the user key to obtain the original shared file of the first user; then, the original shared file of the first user is encrypted by using a temporary key to obtain a temporary file; and then the temporary file is stored in the cloud server, and a temporary URL, which is delivered by the cloud server and corresponds to the temporary file, is obtained.

That the user key is sent to the second user, so that the second user decrypts the obtained shared file by using the user key to obtain the original shared file of the first user is specifically that: the temporary URL and the temporary key are sent to the second user, so that the second user decrypts the obtained temporary file by using the temporary key to obtain the original shared file of the first user.

That is to say, in this embodiment, upon obtaining the shared file accessed by another user and the file description, the trust center decrypts the file description by using the private key corresponding to the public key to obtain the corresponding user key, then decrypts the shared file by using the user key to obtain the original shared file, then re-encrypts the original shared file, re-uploads the re-encrypted shared file (that is, the temporary file) to the cloud server, obtains the corresponding temporary URL delivered by the cloud server, and then sends the temporary URL and the temporary key to the second user, so that the second user obtains the corresponding temporary file according to the temporary URL, and decrypts the temporary file by using the temporary key to obtain the original shared file of the first user.

In the embodiment of the present invention, the trust center re-encrypts the obtained original shared file, and re-uploads the re-encrypted shared file to the cloud server, so that authentication is performed regarding that the first user authorizes another user to access the user data uploaded to a cloud, so as to solve a security problem of sharing a shared file on a cloud server, and meanwhile make it convenient for a user to share shared data stored on a cloud server.

Figure 2:
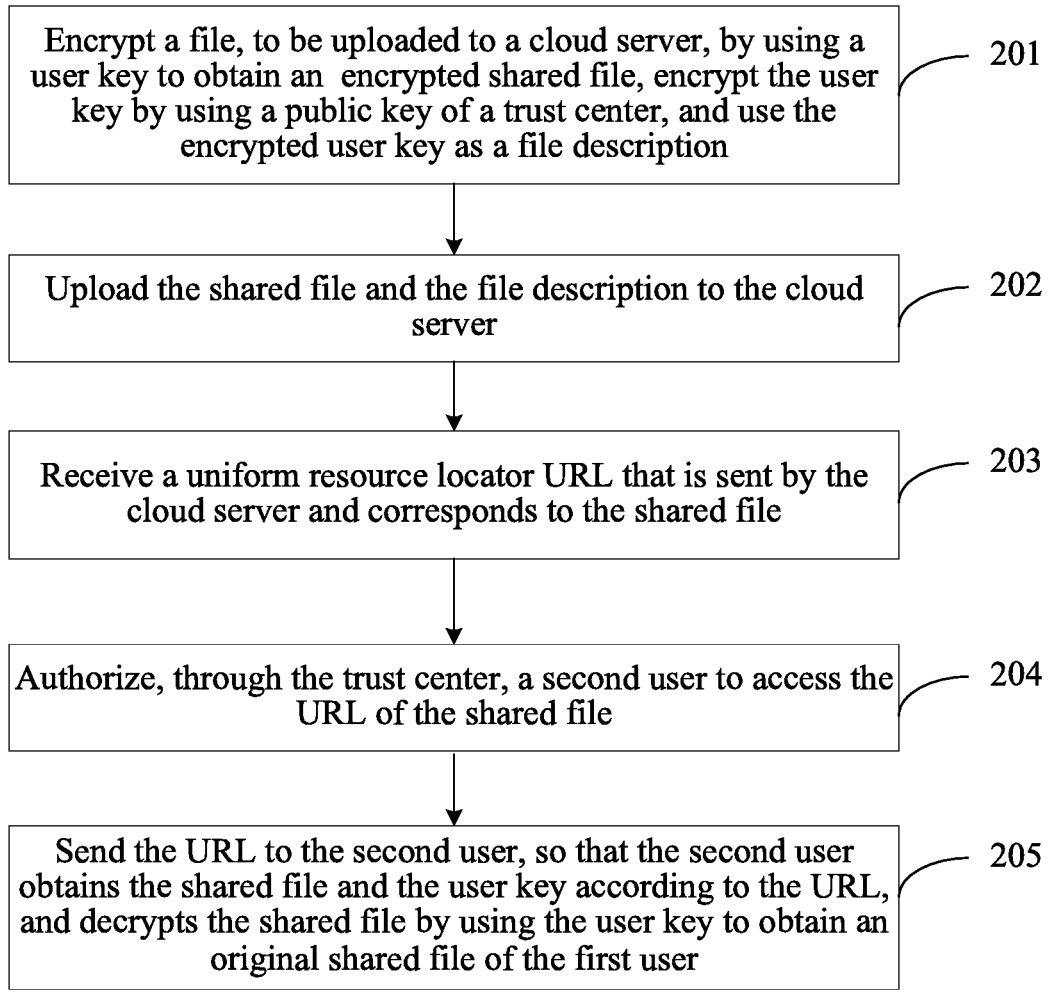
FIG. 2 is another flow chart of a data sharing method according to an embodiment of the present invention.

Referring to FIG. 2, FIG. 2 is another procedure of a data sharing method according to an embodiment of the present invention, and the method includes the following steps.

Step 201: Encrypt a file, to be uploaded to a cloud server, by using a user key to obtain an encrypted shared file, encrypt the user key by using a public key of a trust center, and use the encrypted user key as a file description.

In this step, before uploading a shared file, a user that uploads the shared file (that is, a first user) first encrypts the shared file by using a key of the user (that is, the user key), then the user key is encrypted by using the public key of the trust center, and the encrypted user key is used as the file description of the shared file.

Step 202: Upload the shared file and the file description to the cloud server.

In this step, the first user uploads the encrypted shared file and the file description to the cloud server through a secure channel, and generally, it is regarded by default that it is secure between users and the cloud server.

Step 203: Receive a uniform resource locator URL that is sent by the cloud server and corresponds to the shared file, that is, URL1.

In this step, the first user, through the secure channel, receives the URL (that is, URL1) that is sent by the cloud server and corresponds to the shared file.

Step 204: Authorize, through the trust center, a second user to access the URL of the shared file.

The first user first needs to perform authentication on the second user's identity through the trust center, that is, determine whether the second user is a legitimate user; only if the second user is a legitimate user, can step 205 be executed.

Step 205: Send the URL to the second user, so that the second user obtains the shared file and the user key according to the URL, and decrypts the shared file by using the user key to obtain an original shared file of the first user.

In this step, the process in which the second user obtains the original shared file of the first user mainly includes two situations.

In one situation, the second user obtains the user key of the shared file from the trust center and obtains the shared file from the cloud server according to the URL, and decrypts the shared file by using the user key to obtain the original shared file of the first user.

In the other situation, the second user requests the user key of the shared file corresponding to the URL from the trust center; the second user receives the temporary URL and the temporary key sent by the trust center in response to the request, where the temporary key is a key through which the trust center re-encrypts an original file of the obtained shared file, the temporary URL is a URL corresponding to a temporary file returned by the cloud server, and the temporary file is a file obtained by re-encrypting the original file of the obtained shared file by the trust center by using the temporary key; and the second user obtains the temporary file corresponding to the temporary URL from the cloud server, and decrypts the temporary file by using the temporary key to obtain the original shared file of the first user.

Figure 3:
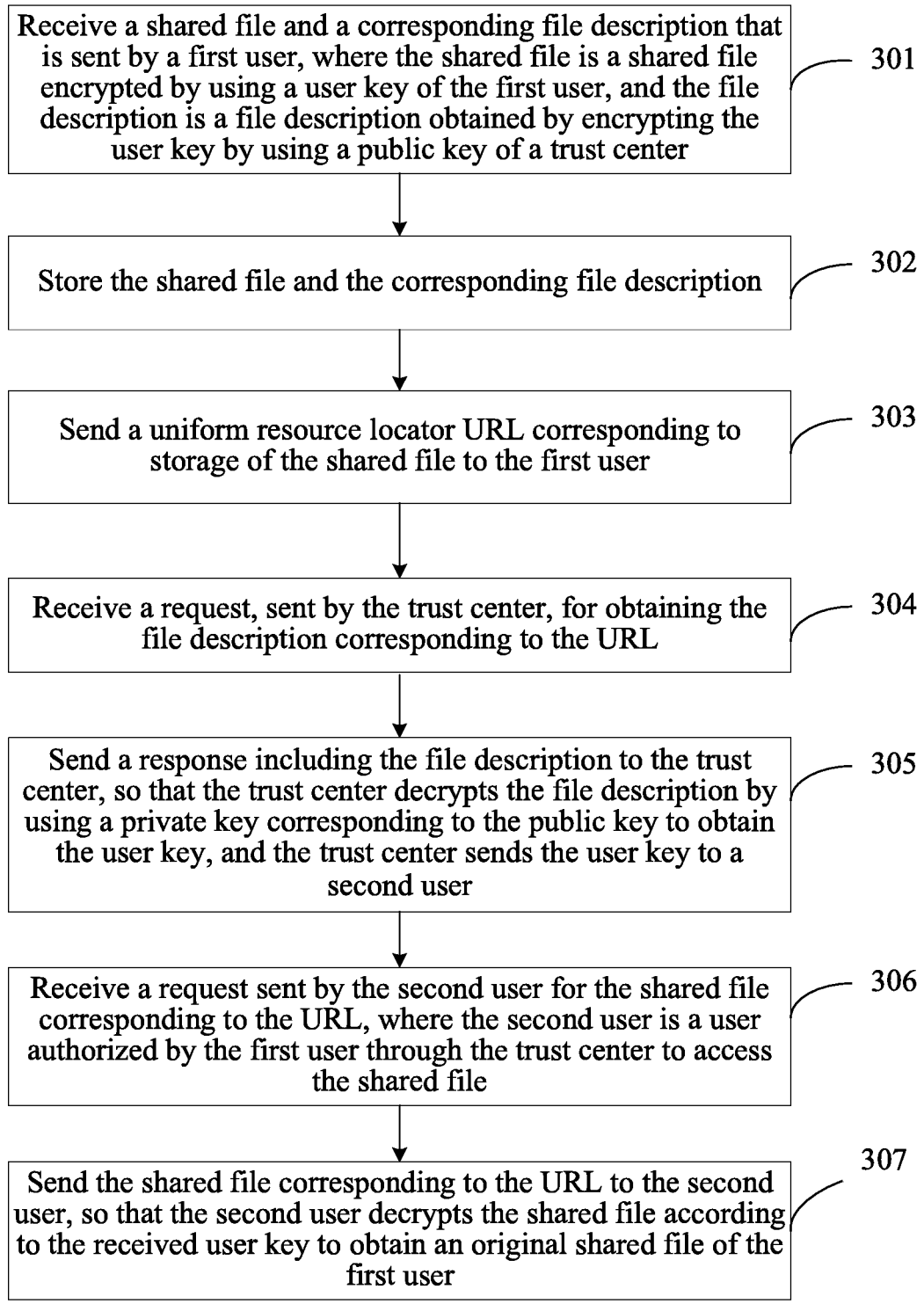
FIG. 3 is yet another flow chart of a data sharing method according to an embodiment of the present invention.

Referring to FIG. 3, FIG. 3 is yet another flow chart of a data sharing method according to an embodiment of the present invention, and the method includes the following steps.

Step 301: Receive a shared file and a corresponding file description that are sent by a first user, where the shared file is a shared file encrypted by using a user key of the first user, and the file description is a file description obtained by encrypting the user key by using a public key of a trust center.

A cloud server (or a server of a cloud service provider) stores the shared file sent by a user and the corresponding file description that are received, and feeds back a uniform resource locator URL corresponding to the shared file to the user, that is, step 302.

Step 302: Store the shared file and the corresponding file description.

Step 303: Send a uniform resource locator URL corresponding to storage of the shared file to the first user.

The cloud server sends the URL of the shared file to the corresponding first user through a secure channel. Then, the first user may authorize, through the trust center, a second user to access the URL of the shared file. When the trust center verifies that the second user is a legitimate user, the first user sends the URL of the shared file to the second user. Then, the second user requests the user key of the shared file from the trust center according to the URL. The trust center requests the corresponding file description from the cloud server according to the URL.

Step 304: Receive a request, sent by the trust center, for obtaining the file description corresponding to the URL.

The cloud server receives, through a secure channel, the request, sent by the trust center, for obtaining the file description corresponding to the URL.

Step 305: Send a response including the file description to the trust center, so that the trust center decrypts the file description by using a private key corresponding to the public key to obtain the user key, and the trust center sends the user key to the second user.

The cloud server sends the file description to the trust center through the secure channel.

Step 306: Receive a request, sent by the second user, for the shared file corresponding to the URL, where the second user is a user authorized by the first user through the trust center to access the shared file.

Step 307: Send the shared file corresponding to the URL to the second user, so that the second user decrypts the shared file according to the received user key to obtain an original shared file of the first user.

Figure 4:
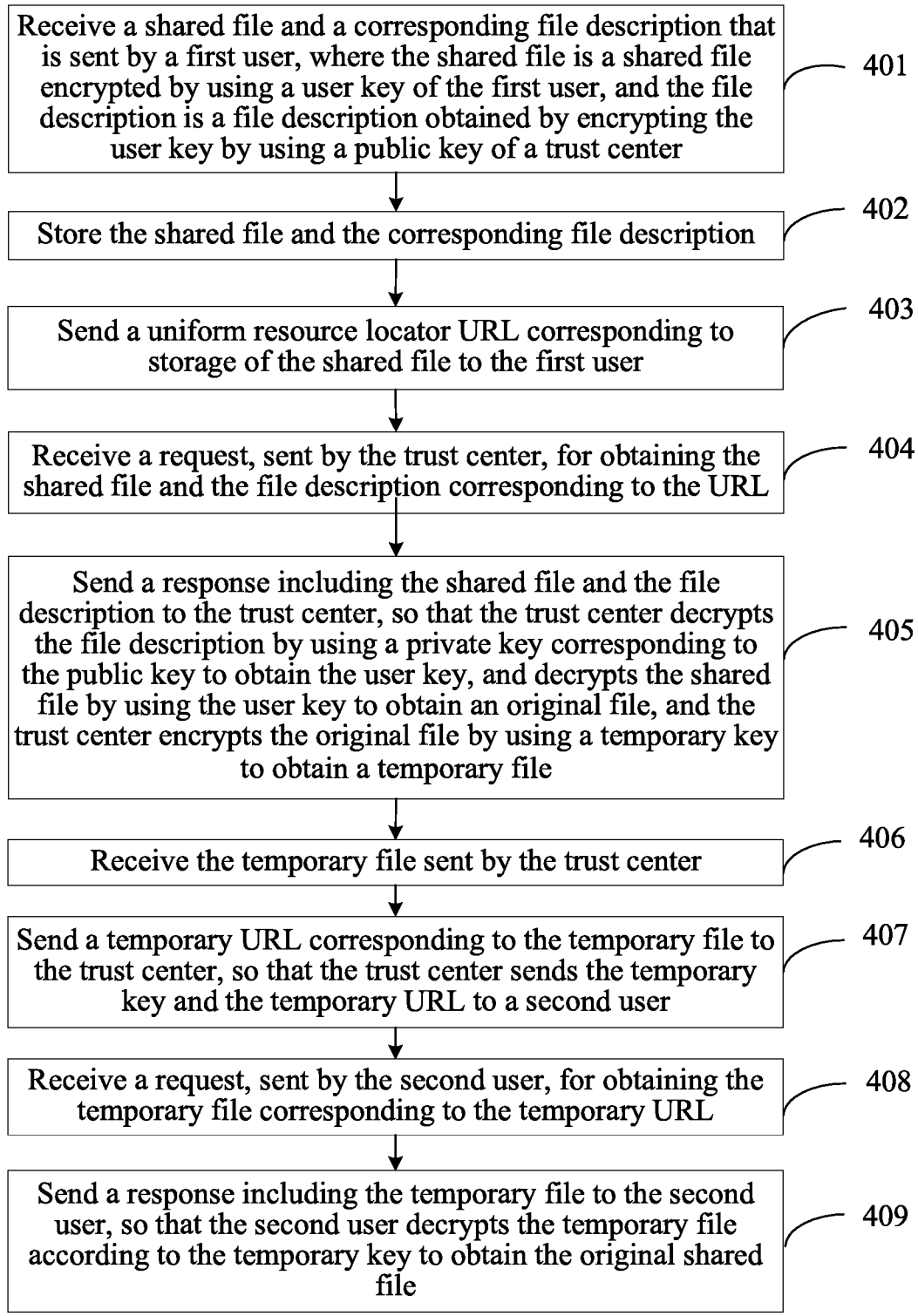
FIG. 4 is yet another flow chart of a data sharing method according to an embodiment of the present invention.

Referring to FIG. 4, FIG. 4 is yet another flow chart of a data sharing method according to an embodiment of the present invention, and the method includes the following steps.

Step 401: Receive a shared file and a corresponding file description that are sent by a first user, where the shared file is a shared file encrypted by using a user key of the first user, and the file description is a file description obtained by encrypting the user key by using a public key of a trust center.

A cloud server receives, through a secure channel, the shared file and the corresponding file description that are sent by the first user.

Step 402: Store the shared file and the corresponding file description.

Step 403: Send a uniform resource locator URL corresponding to storage of the shared file to the first user.

The cloud server sends the URL corresponding to the shared file to the first user through a secure channel.

Step 404: Receive a request, sent by the trust center, for obtaining the shared file and the file description corresponding to the URL.

Step 405: Send a response including the shared file and the file description to the trust center, so that the trust center decrypts the file description by using a private key corresponding to the public key to obtain the user key, and decrypts the shared file by using the user key to obtain an original file, and the trust center encrypts the original file by using a temporary key to obtain a temporary file.

That is to say, the cloud server sends the file description and the shared file to the trust center, and the trust center decrypts the file description according to the private key corresponding to the public key to obtain the user key, decrypts the shared file by using the user key to obtain an original shared file, and then, after obtaining the original shared file of the first user, re-encrypts the original shared file to obtain the temporary file.

Step 406: Receive the temporary file sent by the trust center.

Step 407: Send a temporary URL corresponding to the temporary file to the trust center, so that the trust center sends the temporary key and the temporary URL to a second user.

The trust center uploads the re-encrypted temporary file to the cloud server, and obtains the temporary URL that is delivered by the cloud server and corresponds to the temporary file, and then, the trust center sends the temporary key and the temporary URL to the second user.

Step 408: Receive a request, sent by the second user, for obtaining the temporary file corresponding to the temporary URL.

Step 409: Send a response including the temporary file to the second user, so that the second user decrypts the temporary file according to the temporary key to obtain the original shared file.

Figure 5:
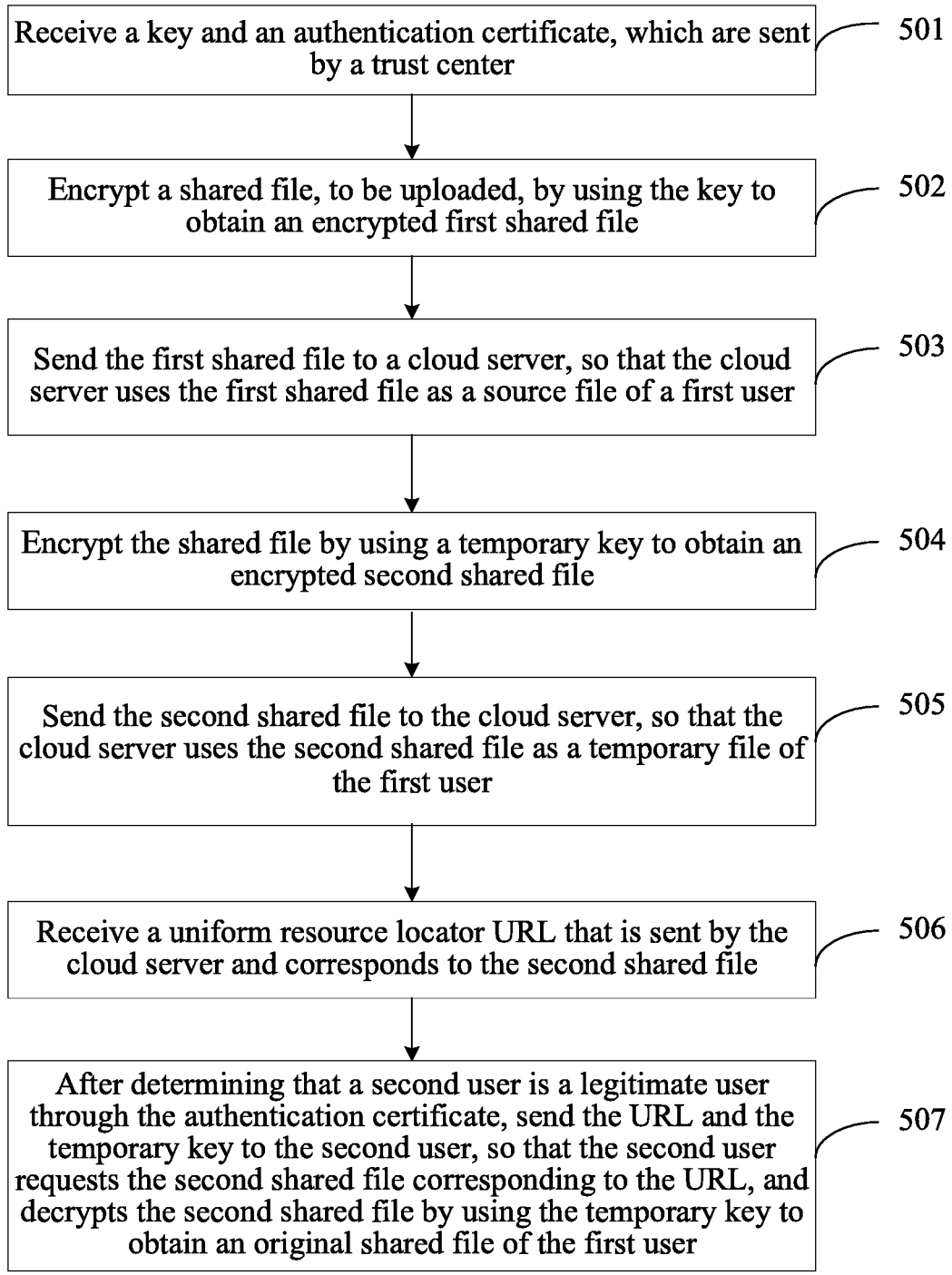
FIG. 5 is yet another flow chart of a data sharing method according to an embodiment of the present invention.

Referring to FIG. 5, FIG. 5 is yet another flow chart of a data sharing method according to an embodiment of the present invention, and the method includes the following steps.

Step 501: Receive a key and an authentication certificate, which are sent by a trust center.

A first user receives, through a secure channel, the key and the authentication certificate for performing identity authentication on a user, which are sent by the trust center.

Step 502: Encrypt a shared file, to be uploaded, by using the key to obtain an encrypted first shared file.

After encrypting the shared file, to be uploaded, by using the key to obtain the encrypted first shared file, the first user executes step 503.

Step 503: Send the first shared file to a cloud server, so that the cloud server uses the first shared file as a source file of the first user.

Step 504: Encrypt the shared file by using a temporary key to obtain an encrypted second shared file.

Step 505: Send the second shared file to the cloud server, so that the cloud server uses the second shared file as a temporary file of the first user.

Step 506: Receive a uniform resource locator URL that is sent by the cloud server and corresponds to the second shared file.

Step 507: After determining that a second user is a legitimate user through the authentication certificate, send the URL and the temporary key to the second user, so that the second user requests the second shared file corresponding to the URL and decrypts the second shared file by using the temporary key to obtain an original shared file of the first user.

Figure 6:
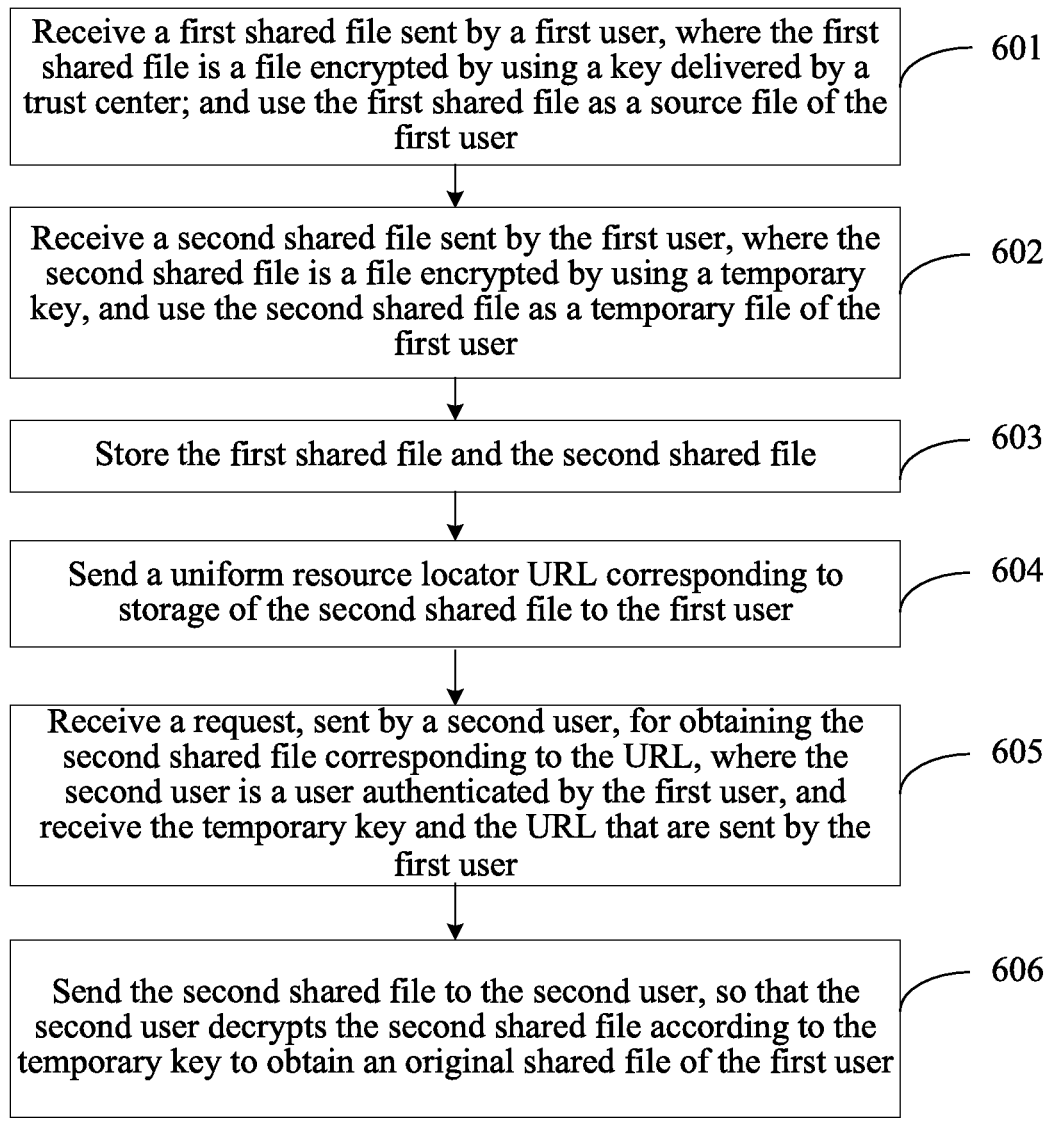
FIG. 6 is yet another flow chart of a data sharing method according to an embodiment of the present invention.

Referring to FIG. 6, FIG. 6 is yet another flow chart of a data sharing method according to an embodiment of the present invention, and the method includes the following steps.

Step 601: Receive a first shared file sent by a first user, where the first shared file is a file encrypted by using a key delivered by a trust center; and use the first shared file as a source file of the first user.

Step 602: Receive a second shared file sent by the first user, where the second shared file is a file encrypted by using a temporary key, and use the second shared file as a temporary file of the first user.

Step 603: Store the first shared file and the second shared file.

In this step, a cloud server may store the first shared file and the second shared file under one URL or different URLs, which is not limited by this embodiment.

Step 604: Send a uniform resource locator URL corresponding to storage of the second shared file to the first user.

Step 605: Receive a request, sent by a second user, for obtaining the second shared file corresponding to the URL, where the second user is a user authenticated by the first user, and receive the temporary key and the URL that are sent by the first user.

Step 606: Send the second shared file to the second user, so that the second user decrypts the second shared file according to the temporary key to obtain an original shared file of the first user.

Figure 7:
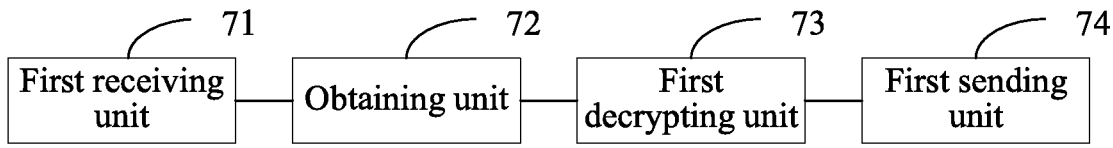
FIG. 7 is a schematic structural diagram of a data sharing device according to an embodiment of the present invention.

Based on the implementation process of the foregoing method, an embodiment of the present invention further provides a data sharing device, of which a schematic structural diagram is shown in FIG. 7. The device includes: a first receiving unit 71, an obtaining unit 72, a first decrypting unit 73, and a first sending unit 74. The first receiving unit 71 is configured to receive a request by a second user through a uniform resource locator URL for a user key of a shared file of a first user, where the second user is a legitimate user authorized by the first user through a trust center to access the shared file, and the shared file is a shared file encrypted by using the user key of the first user. The obtaining unit 72 is configured to obtain, according to the URL, a file description of the corresponding shared file from a cloud server, where the file description is a file description obtained by encrypting the user key by using a public key of the trust center. The first decrypting unit 73 is configured to decrypt the file description by using a private key corresponding to the public key to obtain the user key of the first user. The first sending unit 74 is configured to send the user key to the second user, so that the second user decrypts the obtained shared file by using the user key to obtain the original shared file of the first user.

Optionally, the obtaining unit may further be configured to, while obtaining the file description of the shared file from the cloud server, obtain, according to the URL, the shared file corresponding to the URL; and the device may further include: a second decrypting unit, an encrypting unit, a second sending unit, and a second receiving unit.

The second decrypting unit is configured to decrypt the obtained shared file by using the user key obtained by the first decrypting unit to obtain the original shared file of the first use; the encrypting unit is configured to encrypt the original shared file of the first user by using a temporary key to obtain a temporary file; the second sending unit is configured to upload the temporary file to the cloud server; the second receiving unit is configured to receive a temporary URL that is delivered by the cloud server and corresponds to the temporary file; and the first sending unit is further configured to send the temporary URL and the temporary key to the second user, so that the second user obtains the original shared file of the first user by using the temporary file, which is decrypted and obtained through the temporary key.

The device may be integrated in the trust center, and may also be deployed independently, which is not limited by this embodiment.

For an implementation process of functions and effects of units of the device, reference may be made to a corresponding implementation process in the foregoing method, and details are not repeatedly described herein.

Figure 8:
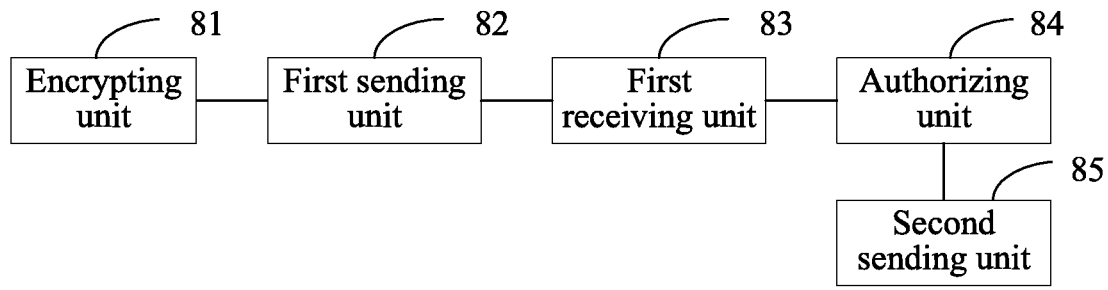
FIG. 8 is another schematic structural diagram of a data sharing device according to an embodiment of the present invention.

Referring to FIG. 8, FIG. 8 is another schematic structural diagram of a data sharing device according to an embodiment of the present invention. The device includes: an encrypting unit 81, a first sending unit 82, a first receiving unit 83, an authorizing unit 84, and a second sending unit 85.

The encrypting unit 81 is configured to encrypt a file, to be uploaded to a cloud server, by using a user key to obtain an encrypted shared file, encrypt the user key by using a public key of a trust center, and use the encrypted user key as a file description; the first sending unit 82 is configured to upload the encrypted shared file and the file description to a cloud server; the first receiving unit 83 is configured to receive a uniform resource locator URL that is sent by the cloud server and corresponds to the shared file; the authorizing unit 84 is configured to authorize, through the trust center, a second user to access the URL of the shared file; and the second sending unit 85 is configured to send the URL to the second user, so that the second user obtains the shared file and the user key according to the URL, and decrypts the shared file by using the user key to obtain an original shared file of the first user.

The device may be integrated in a user terminal.

For an implementation process of functions and effects of units of the device, reference may be made to a corresponding implementation process in the foregoing method, and details are not repeatedly described herein.

Figure 9:
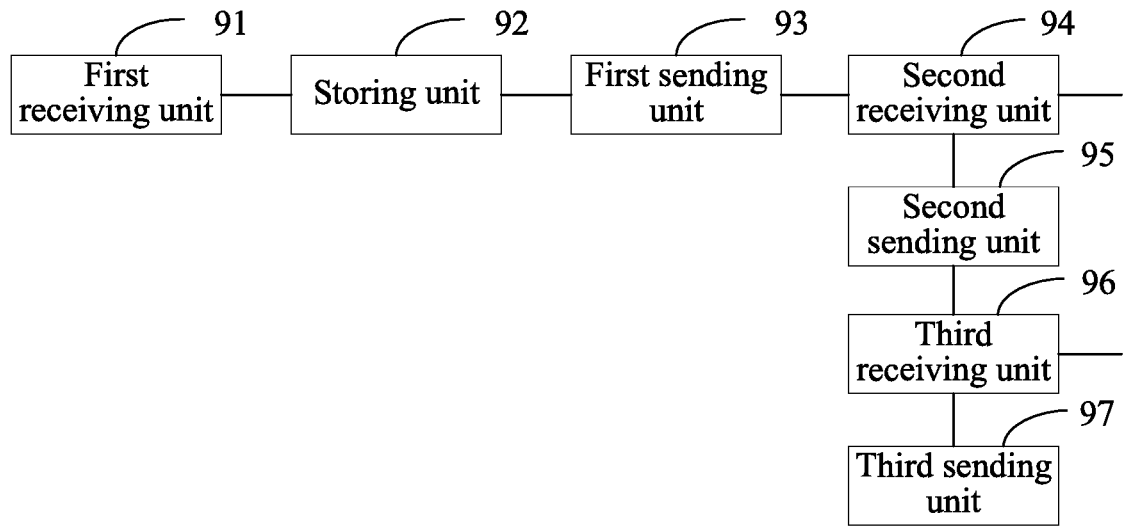
FIG. 9 is yet another schematic structural diagram of a data sharing device according to an embodiment of the present invention.

Referring to FIG. 9, FIG. 9 is yet another schematic structural diagram of a data sharing device according to an embodiment of the present invention. The device includes: a first receiving unit 91, a storing unit 92, a first sending unit 93, a second receiving unit 94, a second sending unit 95, a third receiving unit 96, and a third sending unit 97.

The first receiving unit 91 is configured to receive a shared file and a corresponding file description that are sent by a first user, where the shared file is a shared file encrypted by using a user key of the first user, and the file description is a file description obtained by encrypting the user key by using a public key of a trust center; the storing unit 92 is configured to store the shared file and the corresponding file description; the first sending unit 93 is configured to send a uniform resource locator URL corresponding to storage of the shared file to the first user; the second receiving unit 94 is configured to receive a request, sent by the trust center, for obtaining the file description corresponding to the URL; the second sending unit 95 is configured to send a response including the file description to the trust center, so that the trust center decrypts the file description by using a private key corresponding to the public key to obtain the user key, and the trust center sends the user key to a second user; the third receiving unit 96 is configured to receive a request, sent by the second user, for the shared file corresponding to the URL, where the second user is a user authorized by the first user through the trust center to access the shared file; and the third sending unit 97 is configured to send the shared file corresponding to the URL to the second user, so that the second user decrypts the shared file according to the received user key to obtain an original shared file of the first user.

The device may be integrated in a cloud server, and may also be deployed independently, which is not limited by this embodiment.

For an implementation process of functions and effects of units of the device, reference may be made to a corresponding implementation process in the foregoing method, and details are not repeatedly described herein.

Figure 10:
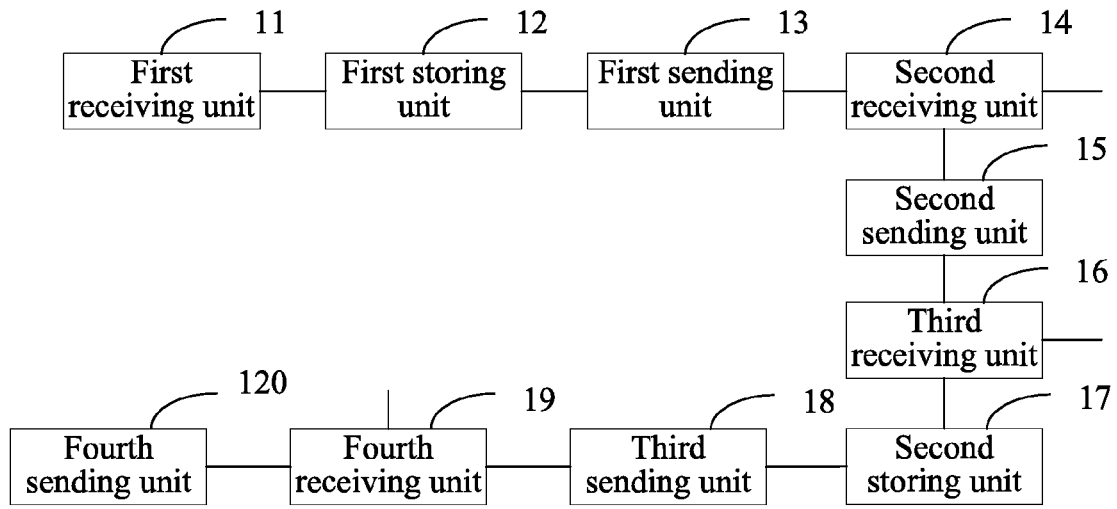
FIG. 10 is yet another schematic structural diagram of a data sharing device according to an embodiment of the present invention.

Referring to FIG. 10, FIG. 10 is yet another schematic structural diagram of a data sharing device according to an embodiment of the present invention. The device includes: a first receiving unit 11, a first storing unit 12, a first sending unit 13, a second receiving unit 14, a second sending unit 15, a third receiving unit 16, a second storing unit 17, a third sending unit 18, a fourth receiving unit 19, and a fourth sending unit 120.

The first receiving unit 11 is configured to receive a shared file and a corresponding file description that are sent by a first user, where the shared file is a shared file encrypted by using a user key of the first user, and the file description is a file description obtained by encrypting the user key by using a public key of a trust center; the first storing unit 12 is configured to store the shared file and the corresponding file description; the first sending unit 13 is configured to send a uniform resource locator URL corresponding to storage of the shared file and the file description to the first user; the second receiving unit 14 is configured to receive a request, sent by the trust center, for obtaining the shared file and the file description corresponding to the URL; the second sending unit 15 is configured to send a response including the shared file and the file description to the trust center, so that the trust center decrypts the file description by using a private key corresponding to the public key to obtain the user key, and decrypts the shared file by using the user key to obtain an original file, and the trust center encrypts the original file by using a temporary key to obtain a temporary file; the third receiving unit 16 is configured to receive the temporary file sent by the trust center; the second storing unit 17 is configured to store the temporary file; the third sending unit 18 is configured to send a temporary URL corresponding to storage of the temporary file to the trust center, so that the trust center sends the temporary key and the temporary URL to a second user; the fourth receiving unit 19 is configured to receive a request, sent by the second user, for obtaining the temporary file corresponding to the temporary URL; and the fourth sending unit 120 is configured to send a response including the temporary file to the second user, so that the second user decrypts the temporary file according to the temporary key to obtain the original shared file.

The device may be integrated in a cloud server, and may also be deployed independently, which is not limited by this embodiment.

For an implementation process of functions and effects of units of the device, reference may be made to a corresponding implementation process in the foregoing method, and details are not repeatedly described herein.

Figure 11:
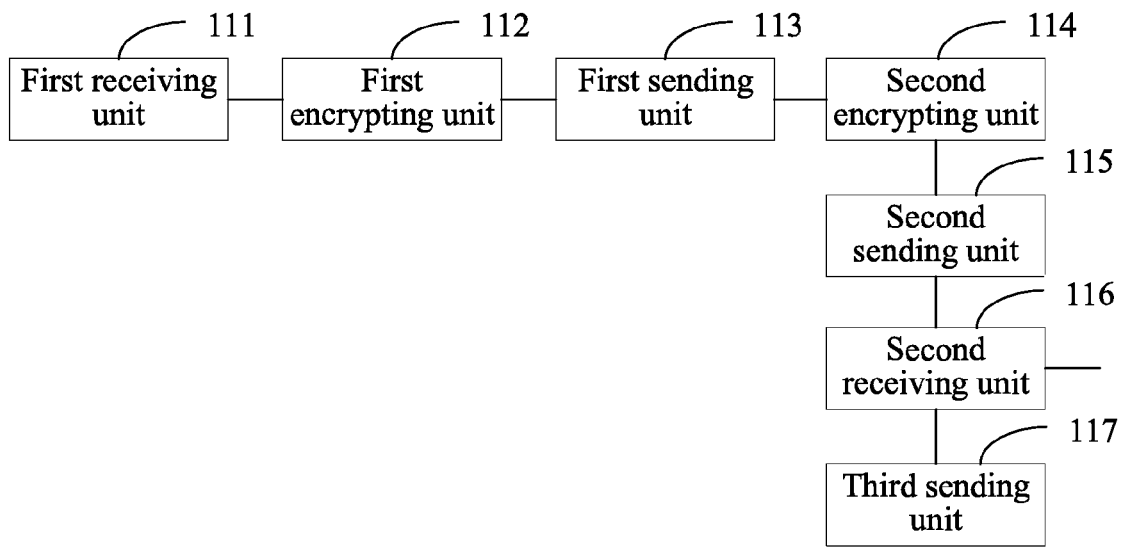
FIG. 11 is yet another schematic structural diagram of a data sharing device according to an embodiment of the present invention.

Referring to FIG. 11, FIG. 11 is yet another schematic structural diagram of a data sharing device according to an embodiment of the present invention. The device includes: a first receiving unit 111, a first encrypting unit 112, a first sending unit 113, a second encrypting unit 114, a second sending unit 115, a second receiving unit 116, and a third sending unit 117.

The first receiving unit 111 is configured to receive a key and an authentication certificate, which are sent by a trust center; the first encrypting unit 112 is configured to encrypt a shared file, to be uploaded, by using the key to obtain an encrypted first shared file; the first sending unit 113 is configured to send the first shared file to a cloud server, so that the cloud server uses the first shared file as a source file of a first user; the second encrypting unit 114 is configured to encrypt the shared file by using a temporary key to obtain an encrypted second shared file; the second sending unit 115 is configured to send the second shared file to the cloud server, so that the cloud server uses the second shared file as a temporary file of the first user; the second receiving unit 116 is configured to receive a temporary uniform resource locator URL that is sent by the cloud server and corresponds to the second shared file; and the third sending unit 117 is configured to, after determining that a second user is a legitimate user through the authentication certificate, send the temporary URL and the temporary key to the second user, so that the second user requests the second shared file corresponding to the temporary URL, and decrypts the second shared file by using the temporary key to obtain an original shared file of the first user.

The device may be integrated in a user terminal.

For an implementation process of functions and effects of units of the device, reference may be made to a corresponding implementation process in the foregoing method, and details are not repeatedly described herein.

Figure 12:
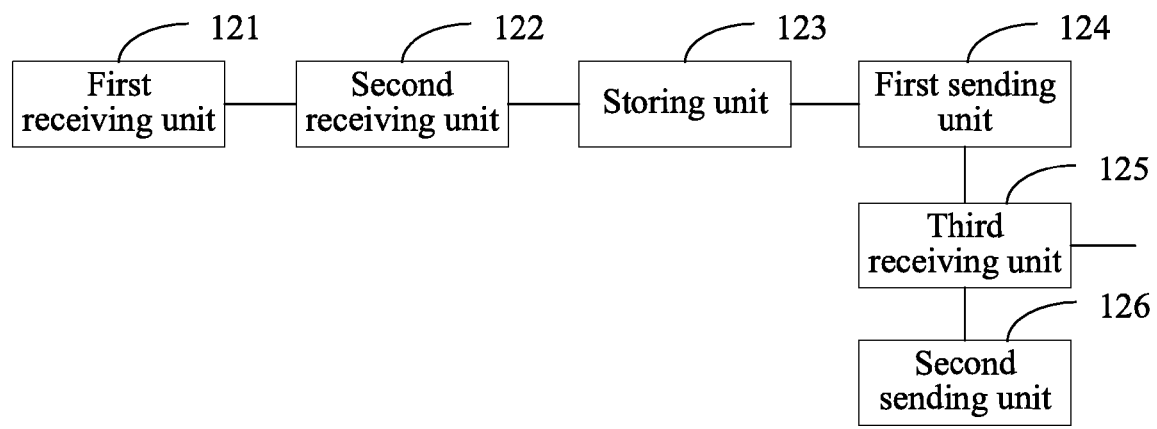
FIG. 12 is yet another schematic structural diagram of a data sharing device according to an embodiment of the present invention.

Referring to FIG. 12, FIG. 12 is yet another schematic structural diagram of a data sharing device according to an embodiment of the present invention. The device includes: a first receiving unit 121, a second receiving unit 122, a storing unit 123, a first sending unit 124, a third receiving unit 125, and a second sending unit 126.

The first receiving unit 121 is configured to receive a first shared file sent by a first user, where the first shared file is a file encrypted by using a key delivered by a trust center; and use the first shared file as a source file of the first user; the second receiving unit 122 is configured to receive a second shared file sent by the first user, where the second shared file is a file encrypted by using a temporary key, and use the second shared file as a temporary file of the first user; the storing unit 123 is configured to store the first shared file and the second shared file respectively; the first sending unit 124 is configured to send a temporary uniform resource locator URL corresponding to storage of the second shared file to the first user; the third receiving unit 125 is configured to receive, sent by a second user, for obtaining the second shared file corresponding to the temporary URL, where the second user is a user authenticated by the first user, and receive the temporary key and the temporary URL, which are sent by the first user; and the second sending unit 126 is configured to send the second shared file to the second user, so that the second user decrypts the second shared file according to the temporary key to obtain an original shared file of the first user.

The device may be integrated in a cloud server, and may also be deployed independently, which is not limited by this embodiment.

For an implementation process of functions and effects of units of the device, reference may be made to a corresponding implementation process in the foregoing method, and details are not repeatedly described herein.

For ease of understanding by a person skilled in the art, the following gives a description through specific application examples.

Embodiment 1

Figure 13:
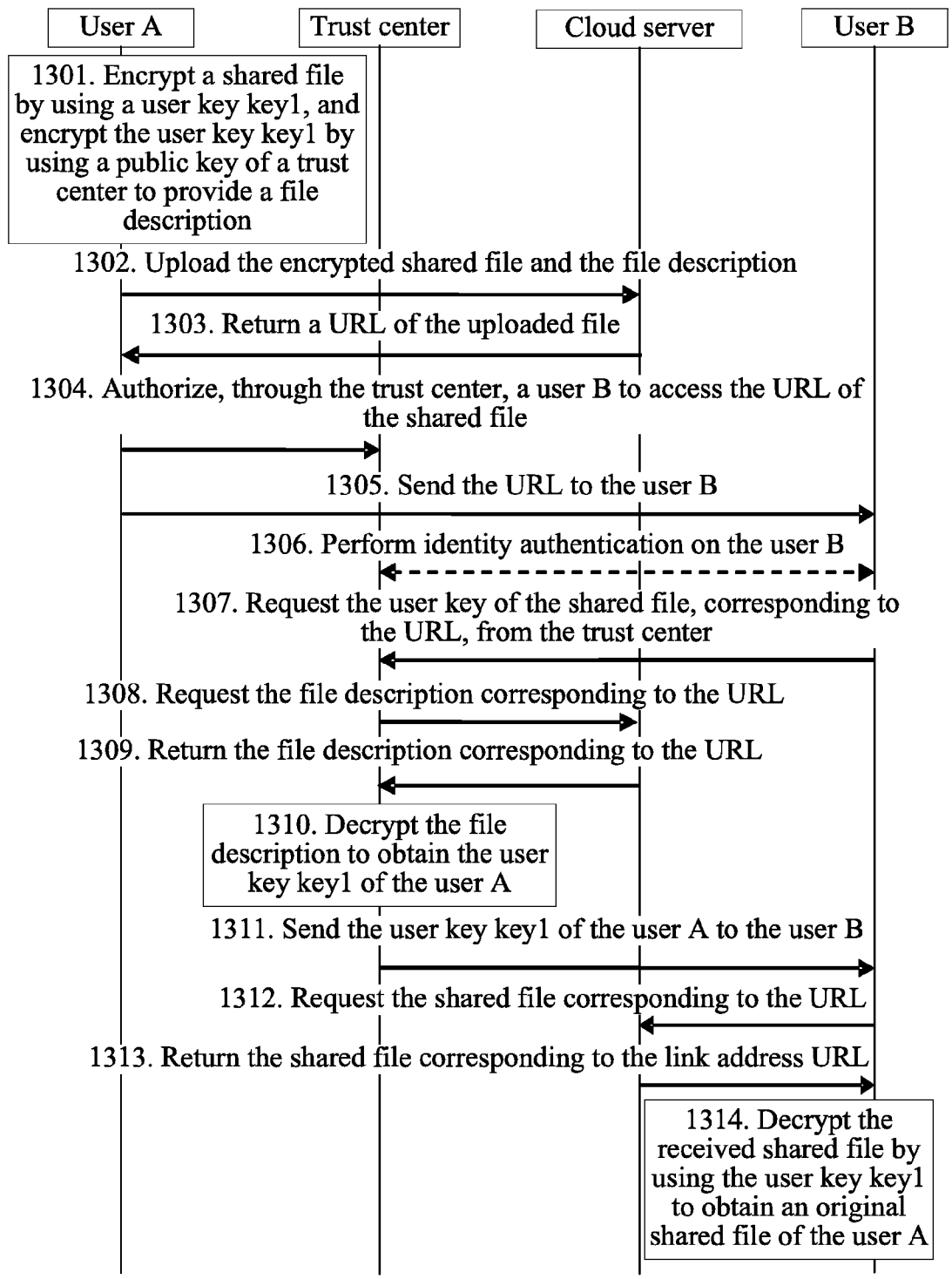
FIG. 13 is a diagram of a first application example of a data sharing method according to an embodiment of the present invention.

Referring to FIG. 13, FIG. 13 is a diagram of a first application example of a data sharing method according to an embodiment of the present invention. The embodiment is applied to a cloud environment to implement user data sharing. The method includes the following steps.

Step 1301: A user A encrypts a shared file, to be uploaded to a cloud server, by using a user key key1 of the user A, and encrypts the user key key1 by using a public key of a trust center to provide a file description.

The public key of the trust center used by the user A is obtained by querying the trust center through a third party.

Step 1302: The user A uploads an encrypted shared file and the file description to the cloud server.

Step 1303: The cloud server returns a uniform resource locator URL corresponding to the uploaded shared file to the user A.

Step 1304: The user A authorizes, through the trust center, a user B to access the URL of the shared file.

Step 1305: The user A sends the URL of the shared file, returned by the cloud server, to the user B.

Step 1306: The trust center performs identity authentication on the user B, and after the authentication is passed, step 1307 is executed.

That is to say, the trust center verifies whether the user B is a legitimate user, that is, performs authentication on identity of the user B.

Step 1307: The user B requests the user key (that is, key1) of the shared file from the trust center through the URL. That is, the user B requests the user key of the shared file corresponding to the URL from the trust center.

Step 1308: The trust center requests the file description, corresponding to the URL, from the cloud server according to the URL in the request of the user B.

Step 1309: The cloud server returns the file description corresponding to the URL to the trust center.

Step 1310: The trust center decrypts the file description by using a private key corresponding to the public key (that is, a private key corresponding to the public key of the trust center used by the user A) to obtain the user key key1 of the user A.

Step 1311: The trust center sends the user key key1 of the user A to the user B through, in this step, a secure channel between the trust center and the user B or another channel, which is not limited in this embodiment.

Step 1312: The user B requests the shared file, corresponding to the URL, from the cloud server.

Step 1313: The cloud server returns the shared file corresponding to the URL to the user B.

Step 1314: The user B decrypts the received shared file by using the received user key key1 of the user A to obtain an original shared file of the user A.

In the embodiment of the present invention, an encryption operation is performed on user data before the user data is uploaded to the cloud server, and only a user authorized at the trust center can access data uploaded to the cloud server, thereby solving a security problem of sharing a cloud file. Confidence of the user in cloud security is improved, and the user is enabled to conveniently share the data stored on a cloud.

Embodiment 2

Figure 14:
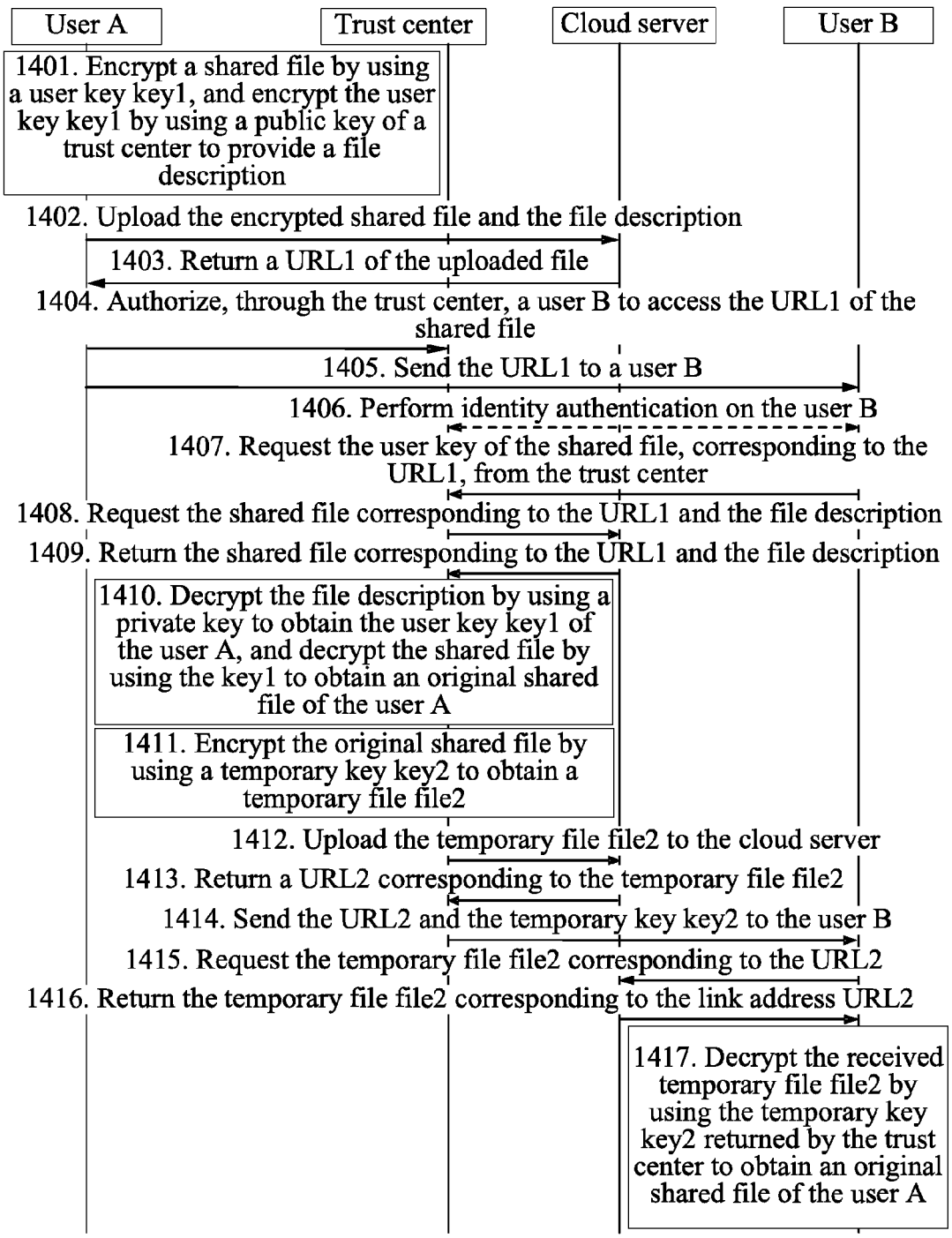
FIG. 14 is a diagram of a second application example of a data sharing method according to an embodiment of the present invention.

Referring to FIG. 14, FIG. 14 is a diagram of a second application example of a data sharing method according to an embodiment of the present invention. The embodiment is applied to implementation of user data sharing in a cloud environment. The method includes the following steps.

Step 1401: A user A encrypts a shared file, to be uploaded to a cloud server, by using a user key key1 of the user A, and encrypts the user key key1 by using a public key of a trust center to provide a file description.

Step 1402: The user A uploads an encrypted shared file and the file description to the cloud server.

Step 1403: The cloud server returns a URL corresponding to the uploaded shared file to the user A, which is, for ease of description, defined as a URL1 in this embodiment.

Step 1404: The user A authorizes, through the trust center, a user B to access the URL1 of the shared file.

Step 1405: The user A sends the URL1 of the shared file to the user B.

Step 1406: The trust center performs identity authentication on the user B, and after the authentication is passed, step 1407 is executed.

The user B undergoes the identity authentication through the trust center.

Step 1407: The user B requests the user key (that is, key1) of the shared file from the trust center through the URL1.

Step 1408: The trust center requests the shared file and the file description, which are uploaded by the user A, from the cloud server according to the URL1 in the request of the user B.

Step 1409: The cloud server returns the shared file and the file description, which are uploaded by the user A, to the trust center.

Step 1410: The trust center decrypts the file description by using a private key corresponding to the public key to obtain the user key key1 of the user A, and decrypts the shared file by using the key1 to obtain an original shared file of the user A.

Step 1411: The trust center encrypts the original shared file by using a temporary key key2 to obtain a temporary file file2.

Step 1412: The trust center uploads the temporary file file2 to the cloud server.

Step 1413: The cloud server returns a temporary URL corresponding to the temporary file file2 to the trust center, which is, for ease of description, defined as a URL2 in this embodiment.

Step 1414: The trust center sends the URL2 and the temporary key key2 to the user B through a secure channel.

Step 1415: The user B requests the temporary file file2, corresponding to the URL2, from the cloud server.

Step 1416: The cloud server returns the temporary file file2 corresponding to the URL2 to the user B.

Step 1417: The user B receives the temporary file file2, and decrypts the received temporary file file2 by using the temporary key key2 returned by the trust center to obtain the original shared file of the user A.

In the embodiment of the present invention, an encryption operation is performed on user data before the user data is uploaded to the cloud server, and after obtaining an original shared file, the trust center re-encrypts the original shared file and uploads the re-encrypted shared file to the cloud server, so that an authorized user accesses data uploaded to the cloud server, solving a security problem of sharing a cloud file. Confidence of the user in cloud security is improved, and the user is enabled to conveniently share the data stored on a cloud.

Embodiment 3

Figure 15:
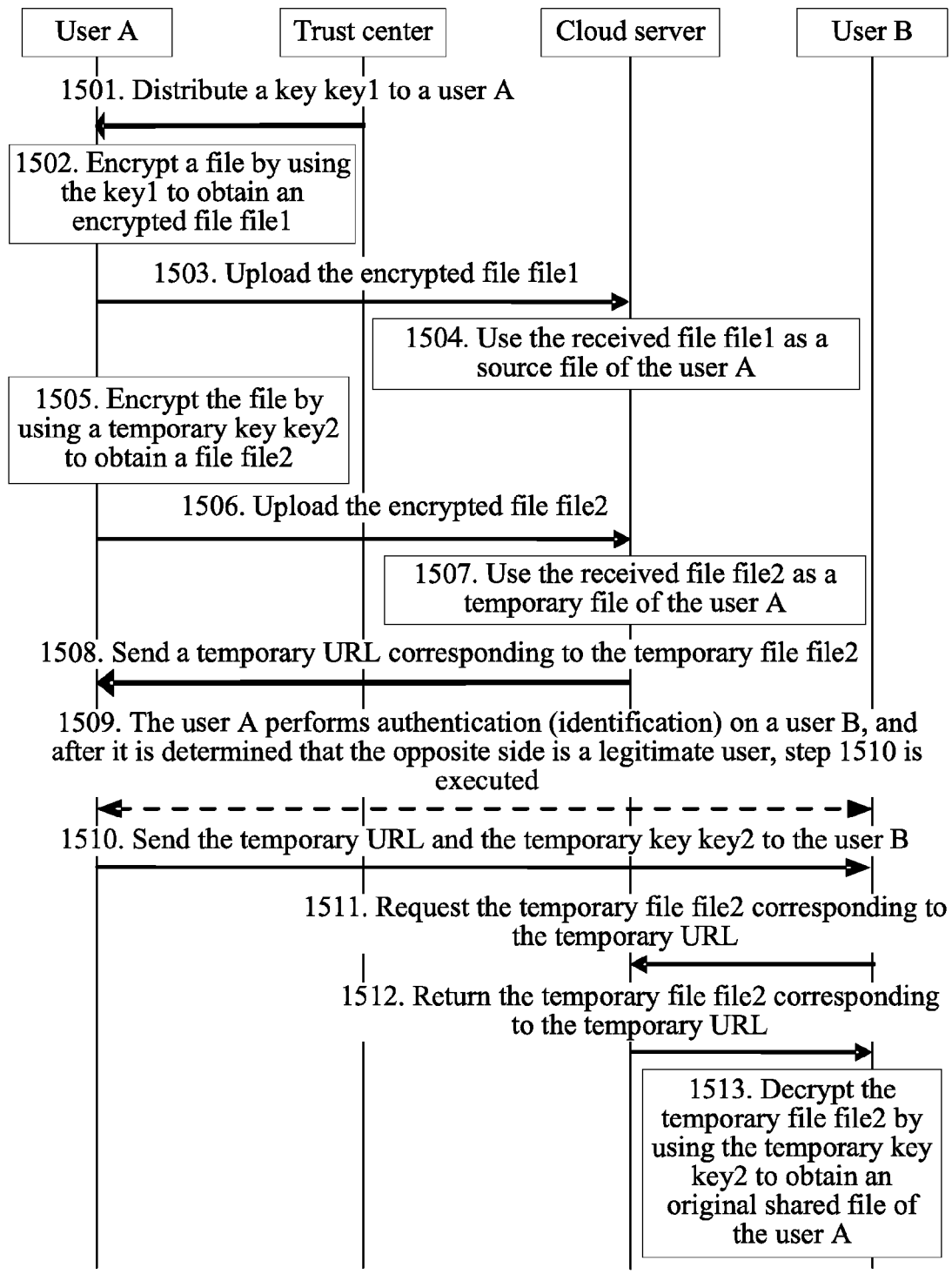
FIG. 15 is a diagram of a third application example of a data sharing method according to an embodiment of the present invention.

Referring to FIG. 15, FIG. 15 is a diagram of a third application example of a data sharing method according to an embodiment of the present invention. The embodiment is applied to implementation of user data sharing in a cloud environment. The method includes the following steps.

Step 1501: A trust center distributes a key key1 to a user A.

The key key1 may be distributed to the user A through a secure channel.

Step 1502: The user A encrypts a file, to be uploaded to a cloud server, by using the key key1 to obtain an encrypted file file1.

Step 1503: The user A uploads the encrypted file file1 to the cloud server.

Step 1504: The cloud server stores the received file file1, and uses the file file1 as a source file of the user A.

Step 1505: The user A randomly selects a temporary key key2, and encrypts the file by using the temporary key key2 to obtain a file file2.

Step 1504 and step 1505 are not subject to a time sequence, and may also be performed at the same time.

Step 1506: The user A uploads the encrypted file file2 to the cloud server.

Step 1507: The cloud server stores the received file file2, and uses the file file2 as a temporary file of the user A, which is called the temporary file file2.

Step 1508: The cloud server sends a temporary URL corresponding to the temporary file file2 to the user A.

Step 1509: The user A performs authentication (identification) on a user B through an authentication certificate issued by the trust center, and after it is determined that the opposite side is a legitimate user, step 1510 is executed.

Step 1508 and step 1509 are not subject to a time sequence, and may also be executed at the same time, which is not limited by this embodiment.

Step 1510: The user A sends the temporary URL and the temporary key key2 to the user B.

Step 1511: The user B requests the temporary file file2 corresponding to the temporary URL from the cloud server.

Step 1512: The cloud server returns the temporary file file2 corresponding to the temporary URL to the user B.

Step 1513: The user B receives the temporary file file2, and decrypts the temporary file file2 by using the temporary key key2 to obtain an original shared file of the user A.

In the embodiment of the present invention, the user receives the key of the trust center in advance, encrypts the file, to be shared, by using the key to obtain the file1, and uploads the file1 to the cloud server; the cloud server uses the file as the source file of the user; then, the user encrypts the file, to be shared, by using the temporary key to obtain the file2, and also uploads the file2 to the cloud server; the cloud server uses the file2 as the temporary file, and uses the temporary file as a file to be accessed by another authorized user, thereby solving a security problem of sharing a cloud file, and meanwhile making it convenient for an authorized user to share data stored on a cloud server.

An embodiment of the present invention further provides a trust center, and the trust center includes a transceiver and a processor.

The transceiver is configured to receive a request by a second user through a uniform resource locator URL for a user key of a shared file of a first user, where the second user is a legitimate user authorized by the first user through the trust center to access the shared file, and the shared file is a shared file encrypted by using the user key; and obtain, according to the URL, a file description of the corresponding shared file from a cloud server, where the file description is a file description obtained by encrypting the user key by using a public key of the trust center.

The processor decrypts the file description by using a private key corresponding to the public key of the trust center to obtain the user key of the first user.

The transceiver is further configured to send the user key to the second user.

Optionally, in another embodiment, for this embodiment, that the transceiver according to the URL, obtains a file description of the shared file from a cloud server in the foregoing embodiment further includes: obtaining the shared file corresponding to the URL.

The processor is further configured to decrypt the obtained shared file by using the user key to obtain the original shared file of the first user; and encrypt the original shared file by using a temporary key to obtain a temporary file.

The transceiver is further configured to upload the temporary file to the cloud server, and obtain a temporary URL that is delivered by the cloud server and corresponds to the temporary file.

That the transceiver sends the user key to the second user specifically includes: sending the temporary URL and the temporary key to the second user.

For an implementation process of functions and effects of the transceiver and the processor that are included in the trust center, reference may be made to a corresponding implementation process in the foregoing method, and details are not repeatedly described herein.

An embodiment of the present invention further provides a user terminal, which includes a transceiver and a processor.

The processor is configured to encrypt a file, to be uploaded to a cloud server, by using a user key to obtain an encrypted shared file, encrypt the user key by using a public key of a trust center, and use the encrypted user key as a file description.

The transceiver is configured to upload the encrypted shared file and the file description to the cloud server; and receive a uniform resource locator URL that is sent by the cloud server and corresponds to the shared file.

The processor is configured to authorize, through the trust center, a second user to access the shared file.

The transceiver is further configured to send the URL to the second user, so that the second user obtains the user key according to the URL and decrypts the shared file by using the user key.

For an implementation process of functions and effects of the transceiver and the processor that are included in the user terminal, reference may be made to a corresponding implementation process in the foregoing method, and details are not repeatedly described herein.

An embodiment of the present invention further provides a cloud server, which includes a transceiver and a storage device.

The transceiver is configured to receive a shared file and a corresponding file description that are sent by a first user, where the shared file is a shared file encrypted by using a user key of the first user, and the file description is a file description obtained by encrypting the user key by using a public key of a trust center.

The storage device is configured to store the shared file and the corresponding file description.

The transceiver is further configured to send a uniform resource locator URL corresponding to storage of the shared file to the first user; receive a request, sent by the trust center, for obtaining the file description corresponding to the URL; send a response including the file description to the trust center, so that the trust center decrypts the file description by using a private key corresponding to the public key to obtain the user key and the trust center sends the user key to a second user; receive a request, sent by the second user, for the shared file corresponding to the URL, where the second user is a user authorized by the first user through the trust center to access the shared file; and send the shared file corresponding to the URL to the second user, so that the second user decrypts the shared file according to the received user key.

For an implementation process of functions and effects of the transceiver and the storage device that are included in the cloud server, reference may be made to a corresponding implementation process in the foregoing method, and details are not repeatedly described herein.

An embodiment of the present invention further provides a cloud server, which includes a transceiver and a storage device.

The transceiver is configured to receive a shared file and a corresponding file description that are sent by a first user, where the shared file is a shared file encrypted by using a user key of the first user, and the file description is a file description obtained by encrypting the user key by using a public key of a trust center.

The storage device is configured to store the shared file and the corresponding file description.

The transceiver is further configured to send a uniform resource locator URL corresponding to storage of the shared file and the corresponding file description to the first user; receive a request, sent by the trust center, for obtaining the shared file and the file description corresponding to the URL; send a response including the shared file and the file description to the trust center, so that the trust center decrypts the file description by using a private key corresponding to the public key to obtain the user key, decrypts the shared file by using the user key, and then re-encrypts the shared file by using a temporary key to obtain a temporary file; and receive the temporary file sent by the trust center.

The storage device is further configured to store the temporary file.

The transceiver is further configured to send a temporary URL corresponding to storage of the temporary file to the trust center, so that the trust center sends the temporary key and the temporary URL to a second user; receive a request, sent by the second user, for obtaining the temporary file corresponding to the temporary URL; and send a response including the temporary file to the second user, so that the second user decrypts the temporary file according to the temporary key.

For an implementation process of functions and effects of the transceiver and the storage device that are included in the cloud server, reference may be made to a corresponding implementation process in the foregoing method, and details are not repeatedly described herein.

It should be noted that in the specification, relational terms such as first and second are used only to differentiate an entity or operation from another entity or operation, and do not require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

Through the foregoing description of the implementation manners, a person skilled in the art may clearly understand that the present invention may be implemented in a manner of software plus a necessary universal hardware platform, and certainly, may also be implemented by hardware; however, in most cases, the former is a preferred implementation manner. Based on such understanding, the technical solutions of the present invention or the part that makes contributions to the prior art can be substantially embodied in a form of a software product. The computer software product may be stored in a storage medium, such as a ROM/RAM, a magnetic disk or an optical disk, and includes several instructions used to instruct a computer apparatus (which may be a personal computer, a server, or a network apparatus, or the like) to perform the method according to each embodiment of the present invention or certain parts of the embodiment of the present invention.

The foregoing description is only exemplary implementation manners of the present invention. It should be noted that, several improvements and modifications may be further made by a person of ordinary skill in the art without departing from the principles of the present invention, and these improvements and modifications shall also be construed as falling within the protection scope of the present invention.

What is claimed is:

1. A data sharing method, comprising:
receiving a request by a second user through a uniform resource locator (URL) for a user key of a shared file of a first user, wherein the second user is a legitimate user authorized by the first user through a trust center to access the shared file of the first user and the shared file of the first user is a shared file encrypted using the user key of the first user;
obtaining, according to the URL, a file description of the shared file of the first user from a cloud server, wherein the file description is a file description obtained by encrypting the user key of the first user using a public key of the trust center, wherein obtaining the file description of the shared file of the first user from the cloud server comprises:
obtaining the shared file of the first user corresponding to the URL;
decrypting the obtained shared file of the first user using the user key of the first user to obtain an unencrypted version of the shared file of the first user;
encrypting the unencrypted version of the shared file of the first user using a temporary key to obtain a temporary file;
uploading the temporary file to the cloud server; and
obtaining a temporary URL that is delivered by the cloud server and corresponds to the temporary file;
decrypting the file description by using a private key corresponding to the public key of the trust center to obtain the user key of the first user; and
sending the user key of the first user to the second user, wherein sending the user key of the first user to the second user comprises sending the temporary URL and the temporary key to the second user.

2. A data sharing method comprising:
encrypting a file to be uploaded to a cloud server, encrypting using a user key of a first user to obtain an encrypted shared file of the first user;
encrypting the user key of the first user using a public key of a trust center;
using the encrypted user key of the first user as a file description;
uploading the encrypted shared file of the first user and the file description to the cloud server;
receiving a uniform resource locator (URL) that is sent by the cloud server and corresponds to the shared file of the first user;
authorizing, through the trust center, a second user to access the shared file of the first user; and
sending the URL to the second user,
wherein obtaining the shared file of the first user and the user key of the first user according to the URL and decrypting the shared file of the first user by using the user key of the first user comprises:
   requesting, by the second user, the user key of the shared file of the first user corresponding to the URL from the trust center;
   receiving a temporary URL and a temporary key sent by the trust center in response to the request, wherein the temporary key is a key through which the trust center re-encrypts the shared file of the first user that is obtained and decrypted to create a temporary file, wherein the temporary URL is a URL that is returned by the cloud server and corresponds to the temporary file, and wherein the temporary file is a file obtained by the trust center by re-encrypting the shared file of the first user that is obtained and decrypted;
   obtaining the temporary file corresponding to the temporary URL from the cloud server; and
   decrypting the temporary file by using the temporary key.

3. The method according to claim 2, wherein, after receiving the URL, the second user can obtain the user key of the first user according to the URL and decrypt the shared file of the first user using the user key of the first user.

4. The method according to claim 2, further comprising obtaining, by the second user, the user key of the first user according to the URL and decrypting the shared file of the first user using the user key of the first user.

5. The method according to claim 4, wherein obtaining the shared file of the first user and the user key of the first user according to the URL and decrypting the shared file of the first user by using the user key of the first user comprises:
   obtaining, by the second user, the user key of the shared file of the first user from the trust center;
   obtaining the shared file of the first user from the cloud server according to the URL; and
   decrypting the shared file of the first user by using the user key of the first user.

6. A data sharing device comprising:
a receiving unit configured to receive a request from a second user through a uniform resource locator (URL) for a user key of a shared file of a first user, wherein the second user is a legitimate user authorized by the first user through a trust center to access the shared file of the first user and the shared file of the first user is a shared file encrypted by using the user key of the first user;
an obtaining unit configured to obtain, according to the URL, a file description of the shared file of the first user from a cloud server, wherein the file description is a file description obtained by encrypting the user key of the first user by using a public key of the trust center, wherein the obtaining unit is further configured to, while obtaining the file description of the shared file of the first user from the cloud server, obtain the shared file of the first user corresponding to the URL, and wherein the data sharing device further comprises:
a decrypting unit configured to decrypt the file description by using a private key corresponding to the public key of the trust center to obtain the user key of the first user;
a second decrypting unit configured to decrypt the obtained shared file using the user key of the first user obtained by the decrypting unit to obtain an original shared file of the first user;
an encrypting unit configured to encrypt the original shared file using a temporary key to obtain a temporary file;
a sending unit, configured to send the user key of the first user to the second user;
a second sending unit configured to upload the temporary file to the cloud server; and
a second receiving unit configured to a temporary URL that is delivered by the cloud server and corresponds to the temporary file, wherein the sending unit is further configured to send the temporary URL and the temporary key to the second user.

* * * * *